Aug. 25, 1964   J. L. JOHNSON   3,145,644
BLENDING AND GRINDING APPARATUS
Filed July 20, 1961   2 Sheets-Sheet 1
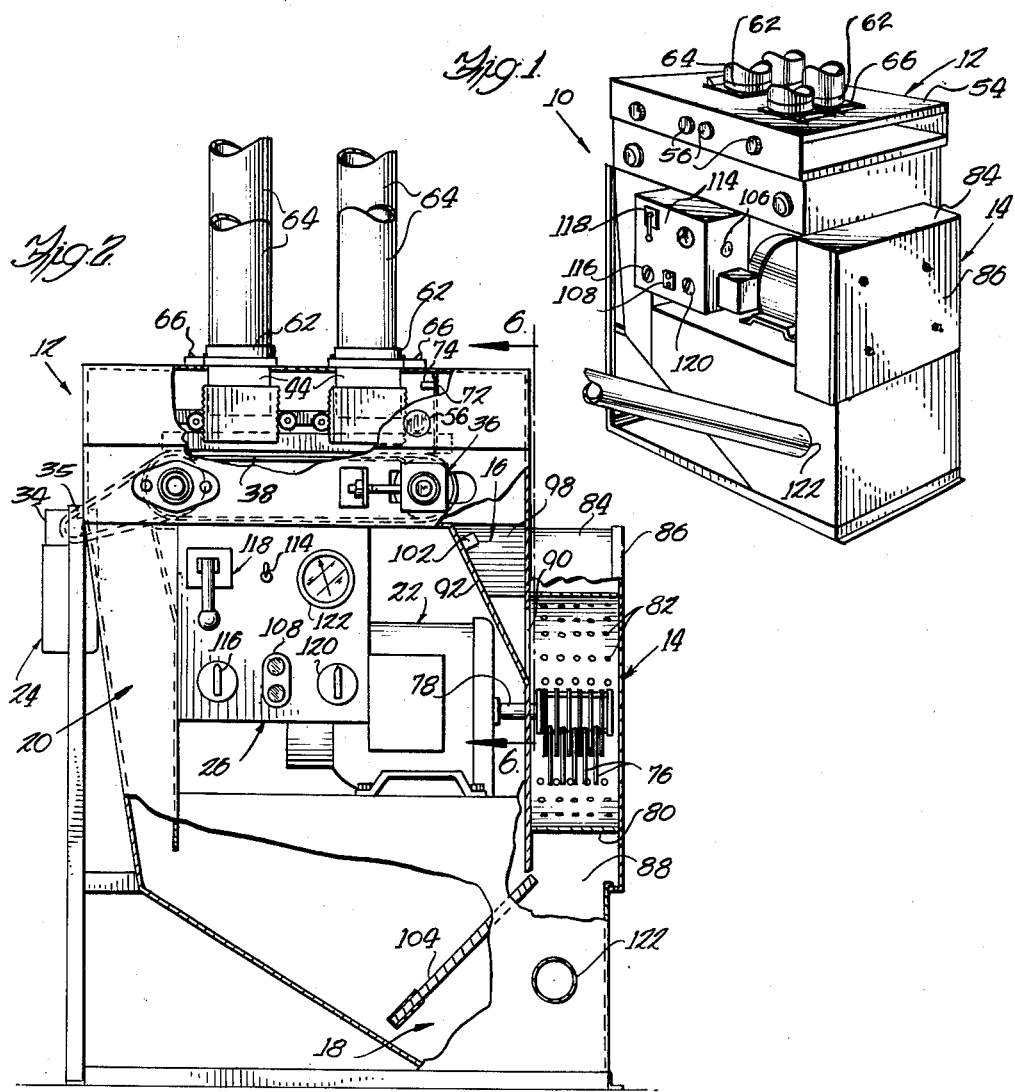
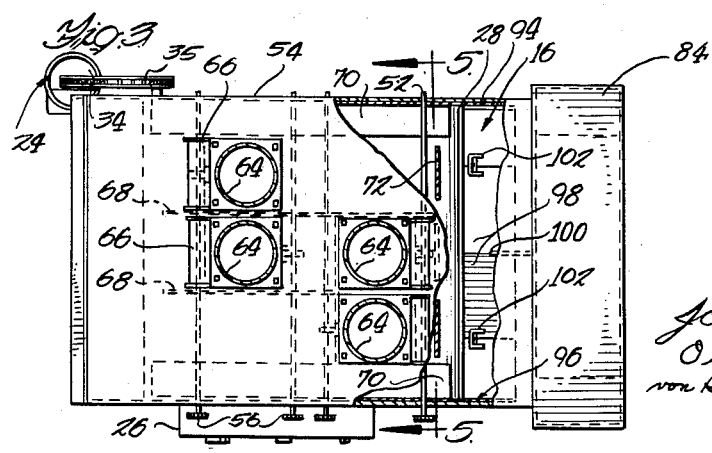
Inventor
John L. Johnson
Olson, Mecklenburger,
von Holst, Pendleton & Neuman
Attorneys

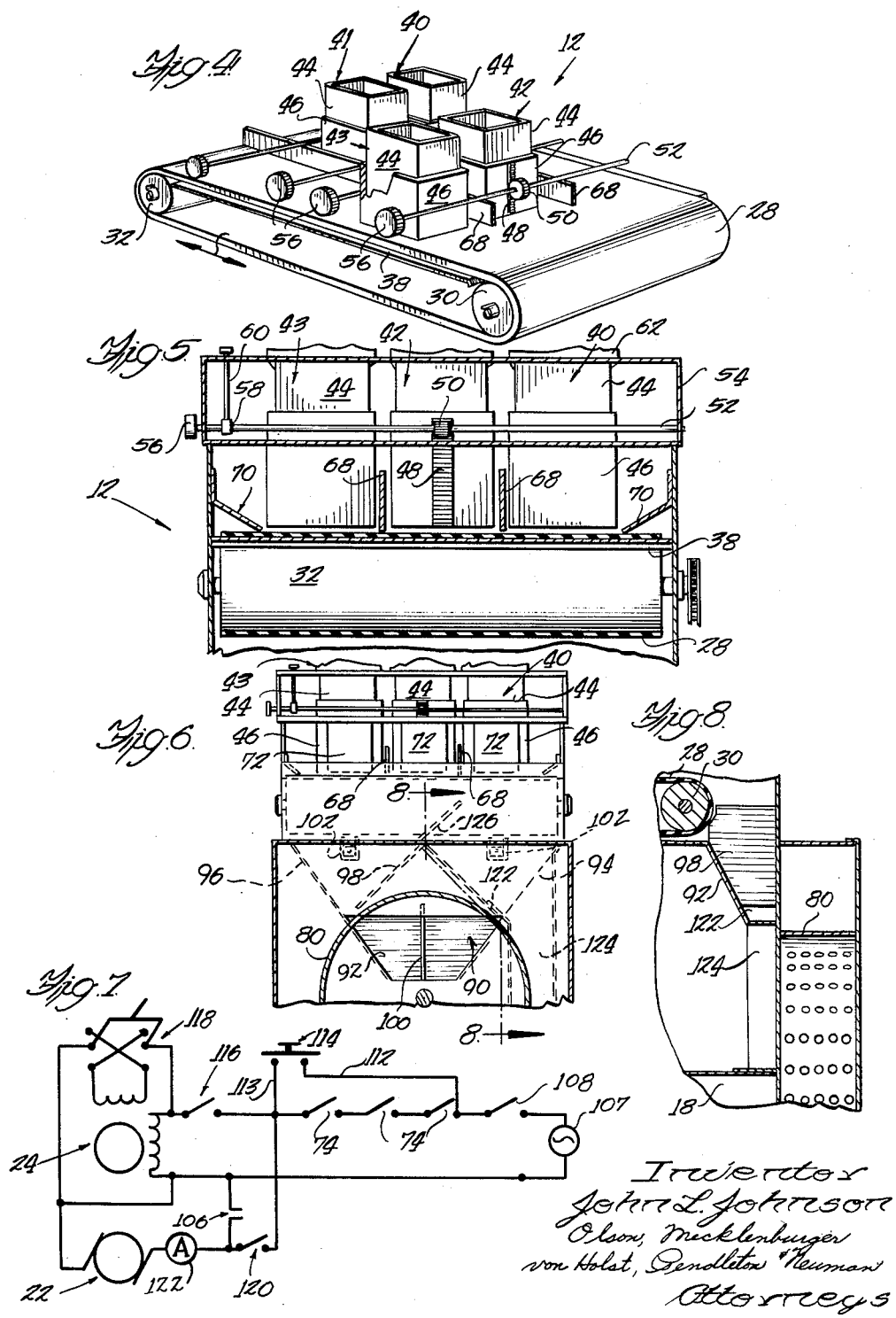

United States Patent Office 3,145,644
Patented Aug. 25, 1964

3,145,644
BLENDING AND GRINDING APPARATUS
John L. Johnson, Decatur, Ill., assignor, by mesne assignments, to The Wyatt Manufacturing Co., Inc., Salina, Kans., a corporation of Kansas
Filed July 20, 1961, Ser. No. 125,452
8 Claims. (Cl. 99—235)

This invention relates to comminuting mills and more particularly to improved apparatus for blending and grinding dry flowable materials, such as cereal grains and other components normally utilized in preparing animal feed rations.

Scientific feeding of livestock, i.e., poultry, cattle, hogs or other animals, requires the provision of a balanced feed ration. These rations are usually obtained by preparing and feeding several ingredients such as one or more cereal grains, feed supplements, concentrates, prepared feeds and/or premixed components. Also, for several reasons, such as palatability, insurance of consumption of a balanced ration, feed conversion efficiency, and simplicity of handling, it is often desirable that the feed ration for animals be in ground or pulverized and thoroughly intermixed form.

The cereal grains usually constitute the major portion of animal feed rations and are normally available in whole kernel form. Other desirable ingredients may be supplied to the animal feeder in granular or lump form. Proper preparation of rations thus usually requires grinding of part or all of the ingredients prior to or during the mixing and blending operations. However, in some instances, as in the preparation of rations from only pre-pulverized material or when feeding whole grains, only a mixing or blending step is required.

In either a blending or a blending and grinding operation, the proportions of the various ingredients should be accurately controlled to insure the preparation of the proper ration.

Various kinds of animals or animals of different ages usually require different feed rations. This requires that a livestock feeder, such as an individual farmer, be equipped to readily prepare two or more rations including varying proportions of different ingredients.

Accordingly, it is an object of this invention to provide a blending and grinding apparatus for optionally blending or blending and grinding several components to readily and accurately produce predetermined prepared rations as outlined above.

It is another object of this invention to provide an improved blending and grinding apparatus for preparing an accurate and complete ration from a plurality of components.

It is another object of this invention to provide an improved compact, unitary, yet economical and simple apparatus for accurately providing a mixed ration from a plurality of components and which is readily changeable from one ration to another.

It is another object of this invention to provide an improved blending and grinding apparatus whereby a blended ration may be obtained and readily and selectively either passed through a grinding apparatus or bypassed around the grinding apparatus to a common collection and discharge point.

It is another object of this invention to provide an improved blending and grinding apparatus for passing part of the components of a ration through a grinding device and bypassing part of the components around the grinding device to a common collection and discharge point.

It is another object of this invention to provide an improved blending and grinding apparatus capable of untended automatic operation which assures the preparation of a complete predetermined ration at all times.

Further and additional objects and advantages will appear from the description accompanying drawings and appended claims.

In carrying out this invention in a preferred illustrative form a blending and grinding mill is provided including: a plurality of metering units disposed over the upper run of a reversible belt type conveyor, a grinding apparatus having an intake passage communicating with the one end of the conveyor, the intake passage of the grinding apparatus including blow-back prevention means therein, a discharge hopper beneath the grinding apparatus for receiving material therefrom, and a fixed conduit communicating with the opposite end of the conveyor and extending downwardly to the discharge hopper. A flat support plate is also provided subjacent the portion of the conveyor belt corresponding to the metering units. The metering units each include a fixed conduit section having a lower end spaced above the upper surface of the conveyor and a movable conduit section in adjustable telescopic relation with the fixed conduit section. Two or more metering units are displaced from one another laterally of the conveyor belt and divider plates are provided to define channels for the metered materials. A control switch arrangement is provided for each channel and includes an operating member extending into the respective channel.

Separate drives are provided for the conveyor and the grinding apparatus. The drive for the conveyor is reversible to pass the material from the metering units to the discharge hopper either through the grinding apparatus or through the fixed conduit means. The control switches control the power to the drives and each drive is provided with an automatic timing switch.

For a more complete understanding of this invention reference should be had to the drawings and the following description setting forth by way of illustration and example certain embodiments of this invention.

In the drawings:

FIG. 1 is a perspective view of a mill embodying the present invention;

FIG. 2 is a enlarged side elevation view, partially in section, of the mill of FIG. 1;

FIG. 3 is an enlarged top plan view, partially in section, of the mill of FIG. 1;

FIG. 4 is an enlarged partially schematic perspective view of the metering apparatus of the mill in FIG. 1;

FIG. 5 is an enlarged partial cross-section view along line 5—5 of FIG. 3;

FIG. 6 is a partial cross-sectional view taken along line 6—6 of FIG. 2;

FIG. 7 is a wiring diagram illustrating the power circuit arrangement utilized in the mill of FIG. 1, and FIG. 8 is a partial cross-sectional view taken along line 8—8 of FIG. 6.

As shown best in FIG. 2 the illustrated mill 10 includes, generally, a metering and conveying unit 12, a grinding apparatus 14, a passage 16 extending from unit 12 to the grinding apparatus, a receiving hopper 18, a by-pass passageway 20 extending from the opposite end of the metering unit 12 to the receiving hopper 18, drive motors 22 and 24 and a suitably wired control panel 26. Each of these units are supported on and within a suitable frame in the positions illustrated. Certain of the units, or their housings, may serve as elements of the support frame.

The metering and conveying unit 12 as best shown in FIGS. 2, 3, 4 and 5 includes and is constructed around an endless conveyor which is preferably an endless belt 28 extending around two rollers 30 and 32. Roller 32 is driven by motor 24 through a drive assembly such as the reduction gear 34 and drive chain 35. Roller 30 is adjustable toward and away from roller 32 through tightening mechanism 36 for tightening belt 28. A generally flat support plate 38 is disposed subjacent the major portion of the upper run of belt 28. This plate supports the upper run in a horizontal position for purposes to be indicated below.

A plurality of metering units 40, 41, 42 and 43 are disposed above the upper run of belt 28. Referring to unit 42 for illustrative purposes, each unit includes an open-ended conduit 44 mounted in fixed position with its lower end spaced above the upper run of belt 28. Another conduit section 46 is telescopically positioned over the lower end of conduit section 44 with its lower end preferably parallel to the upper run of belt 28. Sections 44 and 46 are preferably of close fitting rectangular cross sections to prevent tilting of section 46 as it is moved vertically on section 44. Section 46 is vertically and adjustably supported through a rack 48 thereon which engages a pinion 50 on a rotatably mounted shaft 52. Shaft 52 extends through the housing 54 which surrounds the metering units, and rotation of this shaft may be effected through a hand knob 56. Rotation of shaft 52 adjusts conduit section 46 vertically, thus altering the clearance of the lower end of this section above belt 28. The shaft, and hence section 46, may be fixed in a preselected position through the use of a collar 58 and set screw 60 (see FIG. 5).

Each of units 40, 41 and 43 include components similar to those just described for unit 42. Units 41 and 42 are aligned longitudinally of belt 28, while units 40 and 43 are spaced laterally from units 41 and 42 for reasons to be later noted.

A cooperative supply conduit connecting structure and valve is provided for each of units 40, 41, 42 and 43 above housing 54, (see FIG. 2). Each of these arrangements includes a collar 62 for receiving a supply conduit 64, as well as a sliding gate valve 66 for selectively closing or opening the passageway from the supply conduit 64 to the respective metering unit.

By opening the appropriate slide gate 66, dry flowable material supplied through a conduit 64 may be admitted to the respective metering unit. As belt 28 is driven beneath the metering units, the rate of flow of material from each unit onto the belt is governed by the clearance of the lower end of the respective telescoping conduit section above the belt. Plate 38 supports the upper run of belt 28 in a predetermined horizontal position beneath the lower ends of the metering units regardless of the load placed on the belt by the material in the conduits. Lateral flow of the material on belt 28 is controlled to insure accurate metering by providing longitudinal guide members 68 extending between the laterally spaced metering units, as illustrated, and a pair of side guides 70 along the edges of the belt to define feed channels.

The clearance of each of the conduits 46 above belt 28 may be predetermined for noted positions of knobs 56. Further, by running belt 28 for a known period of time with a known clearance of a unit 46 above the belt and a given material, the flow rate for that material at that setting may be determined. Knobs 56 may then be calibrated in terms of flow rate of a given material to be passed through the metering and conveying unit, or conversion tables may be prepared indicating flow rates in terms of suitable unit indicia on the knobs.

Motor 24 is a reversible motor whereby belt 28 may be driven in one direction to feed the material through passage 16 to grinding unit 14 or in a reverse direction to pass the material from the metering units through by-pass passageway 20 and directly into hopper 18.

It will be noted that belt 28, dividers 68 and members 70 define a plurality of passageways extending longitudinally of the belt 28. An automatic control switch unit is provided at the grinder end of each of these passageways. These units each include an operating plate 72 extending downwardly to a point closely adjacent belt 28 from a hinge mounting near the upper side of housing 54, and a switch 74. Each plate 72 is operatively connected to the respective switch 74, such as by mounting a mercury switch directly on the plate. These switches control the power motors, as by being placed in series therewith, for purposes to be later noted.

The illustrated grinding apparatus 14 comprises a hammer mill unit including a plurality of pivotally mounted hammers 76 supported on shaft 78 driven by motor 22. A circular screen 80 having holes 82 therethrough in the conventional manner circumscribes the hammers 76. A housing 84 including a removable cover 86 surrounds the screen except for an outlet opening 88 to hopper 18 and an inlet opening 90 through the inner wall.

Passage 16 includes an outwardly and downwardly inclined wall 92 extending from beneath the end of conveyor 28 to the lower end of inlet opening 90 as illustrated. Side walls 94 and 96 extend downwardly from the upper edge of plate 92 and converge inwardly to the opening 90. Walls 92, 94 and 96 thus define an inclined chute leading to the opening 90.

An inverted V baffle plate 98 extends from wall 92 to the front wall of passage 16 and is positioned with its apex centered over shaft 82 at the upper side of wall 92. The sides of plate 98 extend from the apex outwardly and downwardly to points adjacent but spaced from side walls 94 and 96. A vertical baffle plate 100 extends from the lower end of passage 16 vertically upwardly beyond the upper limit of opening 90 but terminates short of the apex of plate 98. Plate 100 also extends from plate 92 to the front of passage 16. The baffle plates are positioned in the throat of the feed passageway so that the air currents produced by the hammers, and any material projected upwardly through opening 90 by the hammers, are deflected back into the mill. This aids in forcing the grain through the screen 80 and prevents its being blown into or through the metering and conveying unit. These plates thus eliminate a great amount of dust and increase the capacity of the machine.

The material being fed to the grinding apparatus from the metering and conveying unit 12 passes downwardly from belt 28, between plate 98 and side walls 94 and 96, and thence through opening 90 into the grinding apparatus 14. Permanent magnets may be located in passage 16, as at 102, to attract and retain any stray magnetic material.

A baffle 104 is removably mounted in the discharge hopper 18 as illustrated to minimize the amount of air currents and dust passing upwardly through the passage 20 during the grinding operation. This board may be inserted and removed when cover 86 is detached.

The conveyor and grinder apparatus drive motors 24 and 22 are preferably electric motors. The power control circuitry for these motors is illustrated schematically in FIG. 7, the appropriate manipulable mechanical elements being mounted on panel 26. Provision is made for driving the two motors 22 and 24 and for furnishing power to an outlet 106 from a source 107 with the outlet and the two motors connected in parallel. An on-off switch 108, mounted in panel 26, as well as control switches 74 are connected in series with the motors and outlet. Conductors 112 and 113 together with switch 114 are arranged to by-pass switches 74. A timing switch 116 is placed in series with conveyor motor 24 and a reversing switch 118 is provided for selecting the direction of operation of this motor. Another timing switch 120 is placed in series with the grinding apparatus drive motor 22 and the outlet 106. An ammeter 122 is provided to give an indication of the load on motor 22 and thus the operation of the machine. Outlet 106 may be used for any suitable purpose but is particularly adapted to serve as a power source for an electric drive motor on a conveyor which may be connected through port 122 of the discharge hopper 18 for conveying blended and ground material from this hopper.

In automatic grinding and blending operation, timing switches 116 and 120 are set for a predetermined time interval for which it is desired to operate the mechanism. Switch 120 normally is set to remain closed for a slightly greater period than switch 116 thereby permitting the grinding apparatus to clear subsequent to stopping of the conveyor and metering unit. To start the mill, on-off switch 108 and by-pass switch 114 are closed. As soon as streams of the various ingredients are established through the metering and conveying unit, thereby moving the operating members 72 to actuate switches 74 to a closed position, switch 114 may be released. Thereupon operation of the mill will normally continue automatically until the timing switches open. However, if the flow of one or more of the ingredients is stopped for any reason, the corresponding switch or switches 74 will open to stop the mill. The switches 74 thus prevent unnecessary operation in the event one of the ingredients is exhausted or its flow blocked. The stopping of the mill also signals the operator that the unit is no longer functioning as intended.

In a normal blending and grinding operation, different feed ration ingredients are supplied to two or more of the supply conduits 64. The respective metering units are adjusted to provide the proportional flow of each ingredient which has been determined to result in the desired ration. The mill is then started as outlined above and the materials are automatically blended and ground in the proportions desired for the period of time set on the timing switches or until the flow of one or more of the ingredients is stopped.

In the illustrated machine, four supply conduits are provided, two of which are in longitudinal alignment on the belt 28 as illustrated by units 41 and 42. The same ingredient may be available to both of units 41 and 42, as for supplying the material being utilized in greatest volume. Alternatively, different materials may be supplied to these two units for selective use in different rations. It will be appreciated that the number and pattern of distribution of the metering units may be widely varied to meet the needs of an individual operator. For instance, three or more units may be provided in longitudinal alignment and various numbers of transversely spaced units may be provided to accommodate varying numbers of different ingredients. Individual manually operated by-pass switches may be provided for each member 72 whereby the appropriate control switch 74 may be by-passed if no ingredient is being supplied through one or more of the units.

When it is desired to blend various ingredients without grinding them, switch 118 is positioned to reverse motor 24, thereby reversing the direction of movement of conveyor belt 28 and resulting in discharge of the metered material off the end of the belt above passage 20. The material then drops through passage 20 into discharge hopper 118 from whence it may be removed by the same conveyor unit utilized for removing the material when it passes through the grinding apparatus. Switch 114 is closed to by-pass switches 74 during this reverse operation.

It should be noted that the illustrated construction, wherein the grinder drive motor 22 is positioned between the metering and conveying unit 12 and the discharge hopper 18, with the grinding passage 16 at one end and the blending (without grinding) passage 20 at the other end, results in a very compact unitary mill.

It will be obvious that certain other modifications of the specific embodiment shown may be made without departing from the spirit and scope of this invention. For instance, a by-pass channel may be provided at the grinding end of the mill for passing one or more ingredients directly from belt 28 to the discharge hopper while passing the remaining ingredients through the grinding apparatus 14. Such a passage is illustrated in FIGS. 6 and 8 wherein wall 122 may be inserted to direct the material from metering unit 40 into a conduit 124 which leads directly to hopper 18. This requires an appropriate opening through wall 94. A divider 126 diverts the material from unit 41 or 42 to the opposite side of plate 98. By removing divider 126 and plate 122, and closing the opening to conduit 124, this modified unit can be easily reconverted for a full grinding operation.

It will thus be seen that a blending and grinding mill has been provided which is capable of accurately metering and blending a plurality of different ingredients to provide a predetermined blended and ground feed ration. Further the blending apparatus is flexible in that several different ingredients may be selectively included in the ration and part or all of the ingredients may be blended while by-passing the grinding unit. Each of these operations is carried out with the material being directed to the common collection and discharge hopper for convenient removal. The mill is capable of automatic and untended operation and provision is made for stopping the units in a desired predetermined sequence or, alternatively, stopping the operation should the flow of one of the ingredients be halted, thereby preventing the production of an incomplete ration. Further, these various functional requirements are met with a unitary construction which combines blending and grinding apparatus in a compact, simple and economical mill.

Certain of the inventive principles of this unit are adaptable to any size mill, however the illustrated mill is particularly adaptable for use by individual farmers and/or comparatively small-scale livestock or poultry feeders.

While particular embodiments of this invention are disclosed herein, it will be understood, of course, that the invention is not to be limited thereto since many modifications may be made by those skilled in this art in light of the foregoing disclosure. It is contemplated therefore by the appended claims to cover any such modifications as fall within the true spirit and scope of this invention.

I claim:

1. A mill adapted for metering, blending and comminuting dry flowable materials comprising: a conveyor; adjustable metering means for controlling the flow of a plurality of streams of dry, flowable materials to said conveyor; grinding apparatus adjacent one end of said conveyor; passage means communicating with said one end of said conveyor and with said grinding apparatus; a discharge hopper beneath said grinding apparatus; material receiving means communicating with the other end of said conveyor; drive means for selectively driving said conveyor for discharge of material at said one end or at said other end; means responsive to the presence of material from each of such streams of material for controlling said drive means; drive means for said grinding apparatus; and timing switch means for separately controlling the drive means for said conveyor and for said grinding apparatus.

2. A mill adapted for metering, blending and comminuting dry flowable materials comprising: a conveyor including a substantially flat horizontal upper surface; a plurality of metering units disposed over said conveyor; each of said units including a movable conduit section including a lower end adjacent said conveyor and means for selectively adjusting the clearance of said movable conduit section above said upper surface; means cooperating with said upper surface for defining channels for the material flowing from said metering units; switch means including an operator extending into each of said channels; grinding apparatus adjacent one end of said conveyor; passage means communicating with said one end of said conveyor and with said grinding apparatus; blow-back preventing means in said passage means; a discharge hopper beneath said grinding apparatus; fixed conduit means communicating with the other end of said conveyor and extending downwardly therefrom to said discharge hopper; drive means for selectively driving said conveyor for movement of said upper surface toward said one end or toward said other end and including electromotive means for driving said conveyor; electric circuit means, connecting with said switch means, for controlling said electromotive means; a motor drive connected to said grinding apparatus; and timing switch means for separately controlling said electromotive means and said motor.

3. A mill adapted for metering, blending and comminuting dry flowable materials comprising: a frame; a conveyor including a substantially flat horizontal upper run mounted on said frame; a plurality of metering units disposed over said conveyor; each of said units including a fixed conduit section mounted over said upper run and having a lower end adjacent the upper surface of said upper run, a movable conduit section in adjustable telescopic cooperation with said fixed conduit section and normally extending downwardly from said fixed conduit section, said movable conduit section including a lower end adjacent said conveyor, and means for selectively adjusting the clearance of said movable conduit section above said upper run; means cooperating with said upper run for defining channels for the material flowing from said metering units; pivoted members extending across each of said channels; switch means operatively connected to each of said pivoted members to be operated thereby; grinding apparatus adjacent one end of said conveyor; fixed passage means having an intake substantially the width of said belt and communicating with said one end of said conveyor and with said grinding apparatus; blow-back preventing means mounted in said passage means for permitting passage of material from said conveyor to said grinding apparatus but substantially preventing blow-back from said grinding apparatus; a discharge hopper mounted on said frame beneath said grinding apparatus; fixed conduit means communicating with the other end of said conveyor and extending downwardly therefrom to said discharge hopper; drive means for selectively driving said conveyor for movement of said upper run toward said one end or toward said other end and including electromotive means for driving said conveyor; electric power circuit means connecting said switch means in series with said electromotive means and its power source; a motor mounted beneath said conveyor and between said grinding apparatus and said conduit means; said motor drive connected to said grinding apparatus; and timing switch means for separately controlling said electromotive means and said motor.

4. A mill adapted for metering, blending and comminuting dry flowable materials comprising: a frame; a conveyor including an endless belt with a substantially horizontal upper run mounted on said frame; a plurality of metering units disposed over said conveyor; each of said units including a fixed conduit section mounted over said upper run and having a lower end adjacent the upper surface of said upper run, a movable conduit section in adjustable telescopic cooperation with said fixed conduit section and normally extending downwardly from said fixed conduit section, said movable conduit section including a lower end adjacent said conveyor, a rack on said movable conduit, a rotatable shaft extending adjacent said rack, a pinion mounted on said shaft and in engagement with said rack, and means for selectively rotating and positioning said shaft for adjusting the clearance of said movable conduit section above said upper run; said units displaced from one another laterally of said conveyor; divider plates extending longitudinally of said conveyor between said metering units; said divider plates and the upper surface of said upper run defining channels for material flowing from said metering units; grinding apparatus beneath one end of said conveyor; pivoted members disposed toward said one end of said conveyor from said metering units and extending across each of said channels; switch means operatively connected to each of said pivoted members to be operated thereby; fixed passage means having an intake substantially the width of said belt and communicating with said one end of said conveyor and with said grinding apparatus; an elongated flat plate extending substantially across said passage and inclined from its center downwardly toward its ends; said plate terminating short of the respective ends of said intake passage; a discharge hopper mounted on said framework beneath said grinding apparatus; fixed conduit means communicating with the other end of said conveyor and extending downwardly therefrom to said discharge hopper; drive means for selectively driving said conveyor for movement of said upper run toward said one end or toward said other end and including electromotive means for driving said conveyor; electric power circuit means connecting said switch means in series with said electromotive means and its power source; a motor mounted beneath said conveyor and between said grinding apparatus and said conduit means; said motor drive connected to said grinding apparatus; first timing switch means for controlling said electromotive means; and second timing switch means for controlling said motor.

5. A mill adapted for metering, blending and comminuting dry flowable materials comprising: a frame; an endless conveyor belt with a substantially horizontal upper run mounted on said framework; a plurality of meter units each including conduit portions vertically adjustably mounted over said upper run; grinding apparatus secured to said framework beneath one end of said conveyor; fixed passage means communicating with said one end of said conveyor and said grinding apparatus; a discharge hopper mounted on said framework beneath said comminutor apparatus; fixed conduit means communicating with the other end of said conveyor run and extending downwardly therefrom to said hopper; and drive means for selectively driving said conveyor for movement of said upper run toward said one end or toward said other end and for driving said grinding apparatus; said drive means including a motor mounted beneath said conveyor and between said comminutor apparatus and said conduit means.

6. In a mill adapted for metering, blending and comminuting a plurality of dry flowable ingredients, a conveyor, a plurality of conduits terminating adjacent said conveyor, means for metering dry flowable material from each of said conduits to said conveyor, grinding apparatus adjacent one end of said conveyor, a discharge hopper beneath said grinding apparatus for receiving material from said grinding apparatus, material receiving means communicating with the other end of said conveyor, and means for selectively driving said conveyor for movement of material from said conduits toward either said one or said other end.

7. In a mill adapted for metering, blending and comminuting a plurality of dry flowable ingredients, conveyor means including an endless belt conveyor presenting a substantially horizontal upper surface, a plurality of conduits terminating adjacent said upper surface, said conduits being vertically adjustable to control the clearance of the lower ends thereof from said upper surface for metering flowable material onto said conveyor, grinding apparatus adjacent one end of said conveyor, a discharge hopper beneath said grinding apparatus for receiving material therefrom, conduit means communicating with the other end of said conveyor and with said discharge hopper, and means for selectively driving said conveyor for movement of material from said conduits toward either said one or said other end.

8. In a mill adapted for metering, blending and comminuting a plurality of dry flowable ingredients, a conveyor, a plurality of conduits terminating adjacent said conveyor, means for metering dry flowable material from each of said conduits to said conveyor, grinding apparatus adjacent one end of said conveyor, a discharge hopper adjacent said grinding apparatus for receiving material from said grinding apparatus, conduit means communicating with the other end of said conveyor and with said discharge hopper, first drive means for selectively driving said conveyor for movement from said conduits toward either said one or said other end, second drive means for said grinding apparatus, first timing switch means for controlling said first drive means and second timing switch means for controlling said second drive means.

References Cited in the file of this patent

UNITED STATES PATENTS

| | | |
|---|---|---|
| 347,790 | Gent | Aug. 24, 1886 |
| 411,439 | Hart | Sept. 24, 1889 |
| 895,489 | Morse | Aug. 11, 1908 |
| 1,170,804 | Dunham | Feb. 8, 1916 |
| 1,572,722 | Jacobson | Feb. 9, 1926 |
| 1,601,811 | Church | Oct. 5, 1926 |
| 2,115,632 | Hanley | Apr. 26, 1938 |
| 2,627,356 | Bell | Feb. 3, 1953 |
| 2,788,953 | Schneider | Apr. 16, 1957 |